No. 879,500. PATENTED FEB. 18, 1908.
B. D. STEVENS.
BAND SAW TENSIONING DEVICE.
APPLICATION FILED JAN. 5, 1907.
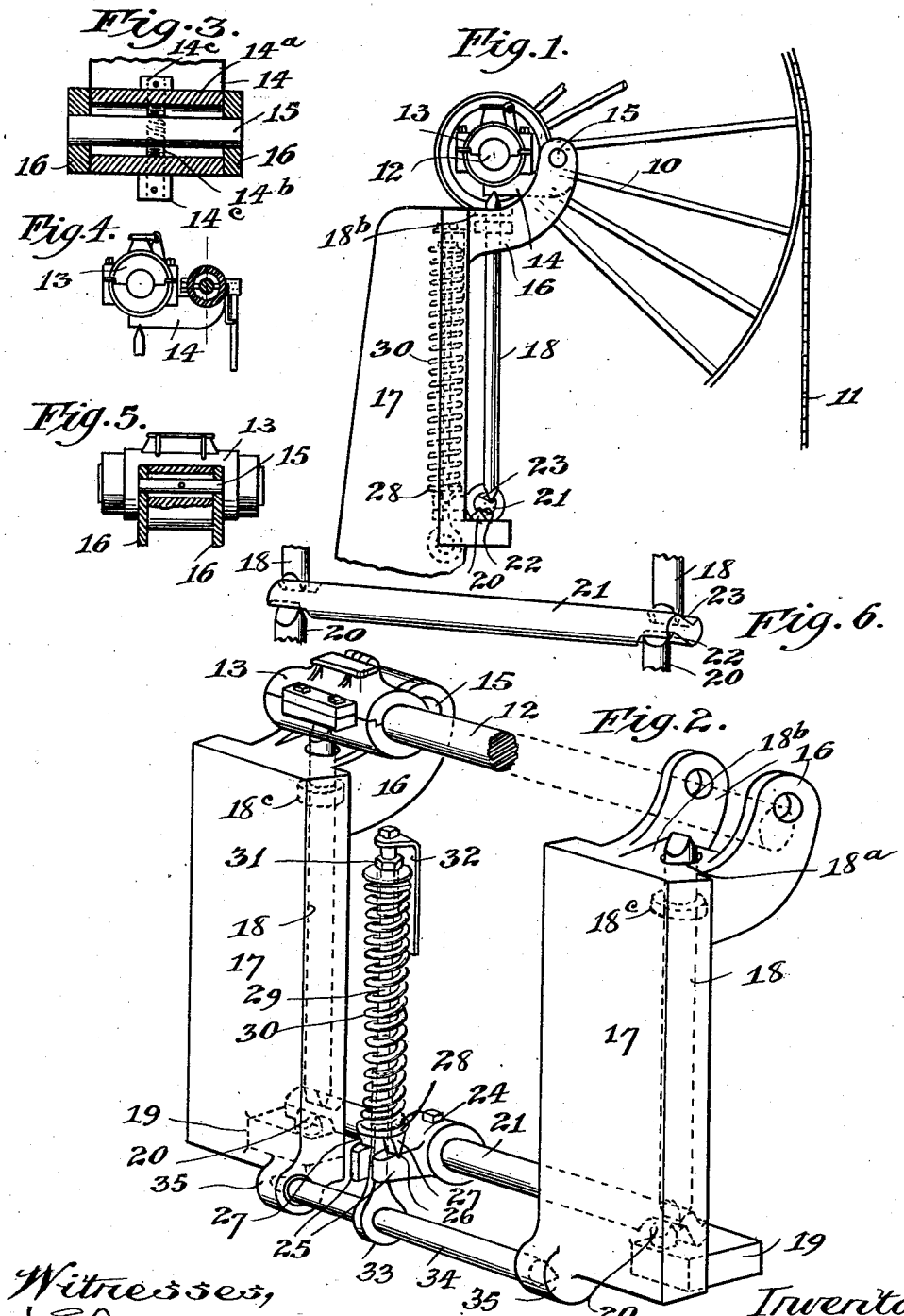

UNITED STATES PATENT OFFICE.

BURT D. STEVENS, OF BELOIT, WISCONSIN, ASSIGNOR TO THE BERLIN MACHINE WORKS, OF BELOIT, WISCONSIN, A CORPORATION OF WISCONSIN.

BAND-SAW-TENSIONING DEVICE.

No. 879,500.      Specification of Letters Patent.      Patented Feb. 18, 1908.

Application filed January 5, 1907. Serial No. 350,940.

*To all whom it may concern:*

Be it known that I, BURT D. STEVENS, a citizen of the United States, residing at Beloit, in the county of Rock and State of Wisconsin, have invented certain new and useful Improvements in Band-Saw-Tensioning Devices, of which the following is a specification.

My invention concerns an improved means for straining or tensioning the band-saw of a mill having a pair of band wheels around which the saw passes, as is usual in this art. Its main object is to provide a sensitive automatic adjustment of one of the band wheels whereby a sufficient tension of the saw is maintained and the adjusted wheel is permitted to yield to any unusual and sudden strain upon the saw, to prevent the latter from breaking. An excessive strain is imposed upon the comparatively weak band-saw when the board first strikes the saw blade, and also when the blade passes through hard and knotty substances or when boards of very uneven thickness are fed into the machine. An unusually excessive strain is put upon the saw when a knot or piece of bark, or the like, becomes lodged between the saw blade and one of the band wheels. Under these conditions it is advisable, and in some cases absolutely necessary, for the saw's sake, to have one of the band wheels automatically adjustable to compensate for the abnormal conditions, otherwise the saw is likely to be broken at any moment. To meet these requirements I have invented a reliable means for adjusting one of the band wheels toward and from its companion, whereby under normal conditions the saw is maintained at the requisite tension; and under unusual conditions, like those mentioned above, the adjustable wheel may yieldingly approach the other wheel an amount depending upon the severity of the strain put upon the saw.

The prior art shows it to be old to tension a saw of this kind by means of a lever and weight, or weight and cushion spring, acting upon the bearings of the upper band wheel; but experience has shown that when a sudden and great strain comes upon the saw, the adjusting means cannot act instantly and immediately because of the inertia of the weight, and, due to the momentum of the weight, it is raised higher than required or necessary to secure the proper regulation of the parts. Furthermore, after the abnormal condition ceases or subsides, the return to original condition of the adjusting device is retarded because of its excessive movement and momentum. Then again, when the weight reaches the limit of its descent and is suddenly stopped, it of itself imposes an abnormal strain upon the saw, which, because of its elasticity, acts in turn to assist in elevating the weight on its rebound, the weight jumping back and forth several times, due to its momentum and to the mutual interaction between the saw and weight. When the weight is provided with a cushion spring, some of the shocks are absorbed or mitigated, but even then the defects of inertia and momentum prevent the devices from being perfectly satisfactory. I have found by actual test that by eliminating the usual weight from the adjusting means and employing a spring alone to tension the saw, a great advantage is gained and the above-mentioned defects of the devices of the prior art are completely overcome. The action of the spring is not hindered by inertia and is not carried beyond the proper point by momentum, as is the case of the weight, or weight and spring, with the resulting period of inaction or deterimental action. The spring is always ready to return the parts to normal position immediately upon the cessation of the unusual condition.

Other features of advantage and novelty will be apparent from the following description taken in connection with the accompanying drawing forming a part of this specification.

In the drawing,—Figure 1 is a fragmentary end elevation of my improved adjusting means, and shows a portion of the upper band wheel and saw; Fig. 2 is a fragmentary perspective view of the same adjusting means; Figs. 3, 4 and 5 are detail views showing the mounting of the pivoted bearings or boxes for the upper saw wheel; and Fig. 6 is a detail of the knife edge bearings.

The upper band wheel 10 coöperating with the band-saw 11 is mounted on a shaft 12 rotatable in a pair of bearings 13, each of which is integral with and supported by an arm 14 near one end thereof, the other end being rotatable with a shaft or pin 15 supported by bracket arms or ears 16 integral with or fastened to two slidable supports 17, the sliding features of which have not been illustrated since they form no part of my present invention. Suffice it to state, however, that supports 17 are slidable vertically in the main frame of the machine, being adjustable by any suitable means, such as screws. The connection of each arm 14 with its shaft 15 is adjustable and includes a sleeve 14$^a$ on the end of each arm 14, loosely encircling its shaft 15. A screw 14$^b$ passes transversely through the sleeve 14$^a$ and shaft 15, as shown in Fig. 3, and is equipped at each end with a collar 14$^c$. As will be apparent, the boxes or bearings 13 can be adjusted for cross-lining the shaft by turning these screws 14$^b$, which will regulate the distance of the box from its shaft or pin 15. Arms 14, bearings 13, shaft 12 and wheel 10 are supported by a pair of upright straining rods 18, which are shaped at both ends to provide knife bearings. Rods 18 engage the under sides of arms 14 at the longitudinal center of the bearings with knife-edge connections, the arms being notched below the axis of shaft 12 for the reception or accommodation of the upper wedge-shaped ends of the rods. Rods 18 slide through openings 18$^a$ in the lateral extensions 18$^b$ of members 17, and each has an enlargement 18$^c$ adapted to limit the upward movement of the rods by striking the under surface of the corresponding extensions 18$^b$. Each member 17 has a lateral ledge or shelf 19 near its lower end, and the two shelves have on their top faces a pair of alined knife-edges 20, upon which is supported a shaft 21 eccentrically notched or grooved at 22 to receive edges 20. The bottom ends of thrust rods 18 are received and rest in additional V-shaped grooves 23 in shaft 21, the grooves being on the opposite side of the longitudinal axis of the shaft 21 from grooves or notches 22. It will be observed therefore that shaft 21 has a knife-edge bearing on its fulcrum or fixed support 20, and a similar bearing for the lower ends of both straining rods 18. A collar 24 having the parallel arms or lateral bifurcated extension 25—25 is fixed to shaft 21 at any convenient point, and the top edges of arms 25—25 are notched in alinement at 26 to receive the wedge-shaped or knife projections 27 on the bottom of a collar 28 slidable on an upright rod 29 and yieldingly pressed downwardly by a spring 30 surrounding the rod. A nut 31 on the upper screw-threaded end of rod 29 enables the spring pressure on collar 25 to be readily varied, and a scale 32 fixed to the rod and adjacent to the nut and spring indicates at all times the adjustment. At its lower end, rod 20 has an apertured enlargement 33 encircling and fixed to a supplemental rotary shaft 34 having at both ends conical bearings in lugs 35 extended outwardly from supports 17.

It will be apparent that spring 30 exerts a constant downward pressure on arms 25, thereby tending to turn shaft 21 to elevate thrust or straining rods 18, shaft 21 and arm 25 constituting in effect a lever, the fulcrum of which is the knife edges 20. The upwardly-forced rods 18 tend to swing bearings 13 upwardly about pins or shafts 15, thereby maintaining the saw-blade under strain or tension. When abnormal saw conditions prevail, wheel 10 can descend to compensate for them against the stress of spring 30. When my improved tensioning device is used in connection with an upper band-wheel, as illustrated, the pressure of spring 30 is made sufficient to sustain the weight of the bearings, shaft, upper wheel, &c., and, in addition, to impose upon the saw the strain desired.

My improvement is also applicable for use with band-saws traveling in horizontal planes, as will be readily understood. It will be observed that the saw wheel, being mounted on the hinged or pivoted arms and the straining rods being free except at their ends, and the spring and rock-shaft being also free to turn, the whole straining mechanism moves with slight friction, and is not restrained or controlled by any guides or other parts likely to bind or interfere with an even tension on the saw. It will also be seen that the straining rods are disposed in line with and immediately below the center of the saw-wheel shaft, and thus act directly and without side thrust in straining the saw.

Although I have described my improved construction in detail, it should be understood that the details of construction may be varied within wide limits without departing from the substance or scope of my invention.

I claim:—

1. In a mounting for a band-wheel or pulley, the combination of a swinging bearing for the shaft of the band-wheel or pulley, a suitably-supported hinge-pin or rod, said bearing having a sleeve loosely encircling said hinge-pin or rod, and an adjusting screw passing through said sleeve and hinge-pin, substantially as described.

2. In a band-saw, a saw-straining device comprising a swinging box or bearing, adjustably mounted on a hinge-pin and a straining rod having a knife-edge engagement with the box or bearing in line with the center of the shaft and at the longitudinal center of the bearing, substantially as described.

3. In a mounting for a band-saw-wheel shaft, a pivoted box or bearing member, a pivot pin or journal for said member, and means for changing the distance between the axes of the pivot pin and the bearing whereby to change the position of the saw-wheel shaft, substantially as described.

BURT D. STEVENS.

Witnesses:
WALTER M. FULLER,
FREDERICK C. GOODWIN.